United States Patent
Jammu et al.

(10) Patent No.: US 7,933,744 B2
(45) Date of Patent: Apr. 26, 2011

(54) SYSTEM AND METHOD FOR MANAGING WIND TURBINES AND ENHANCED DIAGNOSTICS

(75) Inventors: Vinay Bhaskar Jammu, Bangalore (IN); Narayanan Urupuniakavu Madam, Bangalore (IN); Ramesh Perla, Bangalore (IN); Nidhi Naithani, Bangalore (IN); Mahesh Amritlal Morjaria, Atlanta, GA (US)

(73) Assignee: General Electric Company, Niskayuna, NY (US)

( * ) Notice: Subject to any disclaimer, the term of this patent is extended or adjusted under 35 U.S.C. 154(b) by 0 days.

(21) Appl. No.: 12/549,451

(22) Filed: Aug. 28, 2009

(65) Prior Publication Data

US 2010/0138182 A1 Jun. 3, 2010

(51) Int. Cl.
*G06F 11/30* (2006.01)
*G21C 17/00* (2006.01)
(52) U.S. Cl. ....................................... 702/185
(58) Field of Classification Search ......... 702/58, 702/183, 185
See application file for complete search history.

(56) References Cited

U.S. PATENT DOCUMENTS

| 6,925,385 | B2 | 8/2005 | Ghosh et al. | |
| 2002/0029097 | A1* | 3/2002 | Pionzio et al. | 700/286 |
| 2004/0207208 | A1 | 10/2004 | Mikhail et al. | |
| 2004/0230377 | A1* | 11/2004 | Ghosh et al. | 702/3 |
| 2005/0271128 | A1 | 12/2005 | Williams et al. | |
| 2007/0101178 | A1 | 5/2007 | Jammu et al. | |
| 2009/0299697 | A1* | 12/2009 | Hamby et al. | 702/182 |
| 2010/0138267 | A1* | 6/2010 | Vittal et al. | 705/8 |

FOREIGN PATENT DOCUMENTS

WO 0177525 A1 10/2001

OTHER PUBLICATIONS

A. Zaher, S.D.J. McArthur, D.G. Infield, Y. Patel; Abstract: Online wind turbine fault detection through automated SCADA data analysis; Wiley InterScience:: Journals; Research Article; Received: Oct. 7, 2008; Revised: Dec. 12, 2008; Accepted: Dec. 12, 2008; 2 pages.
Smith G.J.; SCADA in wind farms; IEEE Xplore 2.0; Publication Date: Jun. 29, 1993; 1 page.
A. S. Zaher and S.D.J. McArthur; A Multi-Agent Fault Detection System for Wind Turbine Defect Recognition and Diagnosis; Power Tech, 2007 IEEE; pp. 22-27.
European Search Report attached in a corresponding foreign filed application—EP 10173288.1 dated Dec. 14, 2010, Filed on Aug. 18, 2010.

* cited by examiner

*Primary Examiner* — Michael P Nghiem
(74) *Attorney, Agent, or Firm* — Patrick K. Patnode (57) ABSTRACT

A method of wind turbine management includes receiving operational information on operational characteristics of a wind turbine. The operational information is analyzed based on a set of rules, and a determination is made as to whether a fault of the wind turbine is resettable. The set of rules may be configured based on operating configuration of the wind turbine. Advanced operational information may be received for conducting enhanced diagnostics and a determination is made as to whether a fault of the wind turbine is resettable.

9 Claims, 5 Drawing Sheets

SYSTEM AND METHOD FOR MANAGING WIND TURBINES AND ENHANCED DIAGNOSTICS

CROSS REFERENCE TO RELATED APPLICATIONS

This application is related to the following co-pending U.S. patent application Ser. No. 12/549,447, entitled "SYSTEM AND METHOD FOR MANAGING WIND TURBINES" assigned to the same assignee as this application and filed herewith, the entirety of which is incorporated by reference herein.

BACKGROUND

The invention relates generally to wind turbine systems and, more particularly, to systems and methods for management of wind turbines.

Wind turbines are increasingly gaining importance in the area of renewable sources of energy generation. A wind turbine generally includes a wind rotor having turbine blades that transform wind energy into rotational motion of a drive shaft, which in turn is utilized to drive a rotor of an electrical generator to produce electrical power. In recent times, wind turbine technology has been applied to large-scale power generation applications. Modern wind power generation systems typically take the form of a wind turbine farm (or windfarm) having multiple such wind turbines that are operable to supply power to a transmission system providing power to a utility system.

Of the many challenges that exist in harnessing wind energy, one is maximizing wind turbine performance. One of the factors that affect the wind turbine performance is down time due to tripped wind turbines on account of a fault, or unsuitable operating conditions, such as environmental conditions among others. On detection of a fault or unsuitable conditions, the wind turbines are tripped to avoid damage to the wind turbines. Currently, human intervention is required to assess the causes for the wind turbine being tripped and then reset the wind turbine to start operating again. Consequently, long down times of the wind turbine are experienced to have trained personnel to assess, analyze and reset or restart the tripped wind turbine.

Typically, service engineers review the turbine fault logs from a remote location and reset the turbine. In certain instances, a physical inspection or review of the wind turbine may be required to identify the cause of a fault, or to reset the wind turbine, in such cases field service engineers diagnose the faults, fix the root cause for problem and thereafter reset the turbine. The review and reset process for each individual wind turbine usually requires a substantial time from the service engineers. Further, in wind-farms having hundreds or thousands of wind turbines, the review and reset process for each wind turbine that is tripped can be logistically challenging, and in certain cases, may require a substantial turn around time from the service engineers, during which time the wind turbines will be non-operational. The non-operational time of wind turbines may translate in to significant loss of productivity for the wind-farm. Maintaining a staff of multiple service engineers to handle an eventuality of multiple wind turbines requiring support on the wind-farms increases the costs of supporting the maintenance staff significantly.

The aforementioned systems require that manual analysis be conducted on the turbine data for detecting root causes for faults in the wind turbine and the wind turbines are reset through manual commands from service team, either remotely or locally at site. This process leads to substantive down times of wind turbines, causing losses on account of less productivity. Further, maintaining a support staff to analyze fault logs and turbine data; accordingly service the wind turbines further leads to additional maintenance costs. Therefore, a need exists for an improved wind turbine management system that may address one or more of the problems set forth above.

BRIEF DESCRIPTION

In accordance with one aspect of the invention, a wind turbine management system is provided. The wind turbine management system includes a wind turbine operable to generate electricity using wind energy. The wind turbine comprises operational characteristics related to the operation of the wind turbine. A control server comprises a wind turbine management module. The wind turbine management module is configured to implement the steps of receiving operational information on the operational characteristics of the wind turbine, analyzing the operational information based on a set of rules, and determining whether a fault of the wind turbine is resettable.

According to an aspect, the set of rules are configurable, and may be configured based on operational parameters or characteristics such as historical data, heuristic data, engineering data for the wind turbine, environmental factors, wind turbine configuration, among several others. The system further includes a network that operably couples the wind turbine and the management module. Further, a rule configuration module is accessible via the network.

In accordance with an aspect of the invention, a method of wind turbine management is provided. The method includes receiving operational information on operational characteristics of a wind turbine. The operational information comprises operational data. The operational information is analyzed based on a set of rules, and a determination is made as to whether a fault of the wind turbine is resettable.

In accordance with another aspect of the invention, a method of wind turbine management is provided. The method includes receiving and analyzing operational information on operational characteristics of a wind turbine. The operational information is analyzed based on a set of rules, and a determination is made as to whether advanced operational information is required. Advanced operational information is received and analyzed based on the set of rules, and a determination is made as to whether a fault of the wind turbine is resettable.

DRAWINGS

These and other features, aspects, and advantages of the present invention will become better understood when the following detailed description is read with reference to the accompanying drawings in which like characters represent like parts throughout the drawings, wherein.

DETAILED DESCRIPTION

As described in detail below, embodiments of the present invention provide systems and methods for managing wind turbines. Wind turbines are managed based on a number of operational parameters of the wind turbine and the environmental conditions. Due to certain operational faults, a wind turbine may be tripped for the safety of the wind turbine. Some non-limiting examples of the conditions that may cause trip of the wind turbine include wind gust conditions, temperatures in mechanical components such as gears, bearings and others, exceeding a threshold value, excess voltage or excess current faults, faults in converter and certain other hardware units, faults in generator and rotor speed sensors, tower vibrations, grid event fault. Wind turbines may trip due to several reasons, including faults induced by transient operating conditions, unsuitable environmental conditions, among other conditions. Many cases of wind turbines being tripped are due to a "soft fault" or a "resettable fault." A soft fault may be due to a fault that is transient in nature, or in general, a fault causing a trip of the wind turbine after which the wind turbines may be safely reset within a short time interval. Some non-limiting examples of the operational conditions inducing soft faults include wind gust conditions, temperatures in mechanical components such as gears, bearings and others, exceeding a threshold value, excess voltage or excess current faults, faults in converter and certain other hardware units, faults in generator and rotor speed sensors, tower vibrations, grid event fault. The system includes a set of rules to analyze the nature of the fault, and determine whether the fault is resettable. A "hard fault" is a fault that causes trip of the wind turbine and requires an on-site intervention for the wind turbine. Systems and methods disclosed herein provide for, including other features, identifying and automatically resetting a tripped wind turbine in case of soft faults. Further, advanced diagnostic logs are generated for experts to study and reduce trip resolution time. In case of hard faults, in addition to a detailed diagnostic log, an error message is generated indicating that on-site maintenance for the wind turbine is required.

Figure 1:
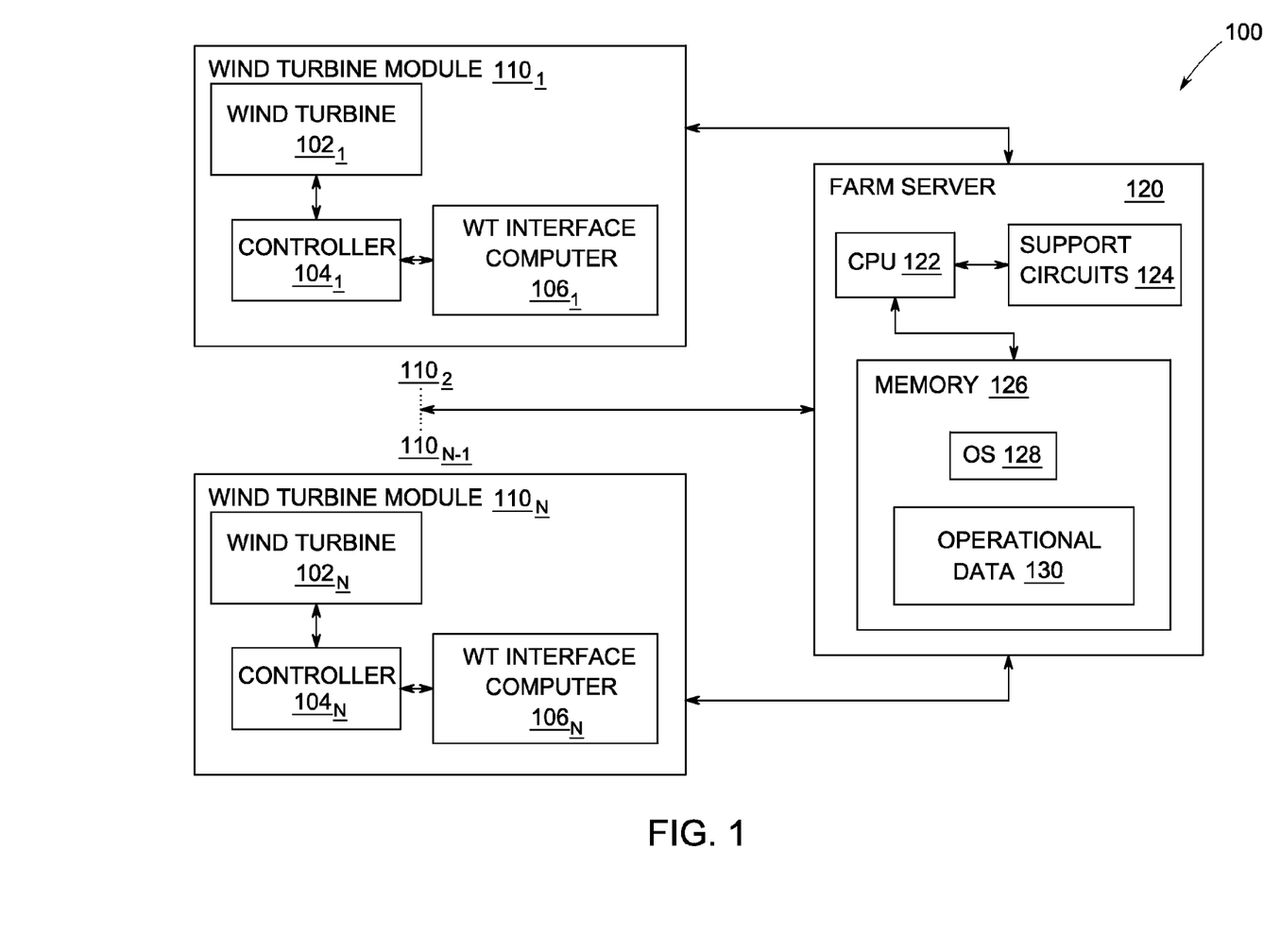
FIG. 1 is a block diagram representation of a wind turbine farm according to an embodiment of the invention.

FIG. 1 illustrates a block diagram representation of a wind farm 100 according to an embodiment of the present invention. The wind farm 100 comprises multiple wind turbine modules $110_1$, $110_2$ . . . $110_N$, each of the multiple wind turbine modules 110 being communicably coupled to a farm server 120. Each of the wind turbine modules, for example, the wind turbine module $110_1$ comprises a wind turbine 102, a controller 104, and an interface computer 106. The controller 104 is configured to receive operational information associated with the wind turbine 102 and the wind turbine module 110. The controller 104 is also configured to control the operations of the wind turbine module 110 including tripping or resetting the wind turbine 102, among others. The interface computer 106 may be configured to receive data from the controller 104 and act as an interface between the controller 104 and the server 120. In some embodiments, the interface computer 106 is configured to accesses and processes additional or advanced operational information of the wind turbine 110. The interface computer 106 is further configured to store and retrieve the advanced or additional information of the wind turbine module 110, among other functions.

The farm server 120 is configured to receive and process operational information for each of the wind turbine modules $110_1$ . . . $110_N$. The wind turbine module 110 and the farm server 120 may be communicably coupled through a wire, cable, optical fiber and the like. However, one of ordinary skill would recognize that other ways of coupling communicably, such as, through a wireless link facilitated by various types of well-known network elements, such as hubs, switches, routers, and/or the like, would result in equally valid embodiments of the present invention.

Generally, the wind turbine 102 is employed to harness wind energy and convert the wind energy into other useful forms, for example, electricity. In one embodiment, the wind turbine 102 converts the wind energy to kinetic energy that is provided to a generator (not shown in the figures). The generator converts the kinetic energy to electricity, which may then be supplied to a power grid. The wind turbine 102 may further include various other components to support the functionality, monitoring, maintenance and other functions of the wind turbine 102. Other such components include, but are not limited to, components such as sensors, circuitry, converter, gears, bearing, rotors, and such components are not shown for the sake of simplicity. The controller 104 is configured to monitor and control all such components and the wind turbine 102 of the wind turbine module 110.

The controller 104 is any type of programmable logic controller that comprises a Central Processing Unit (CPU), various support circuits and a memory. The CPU of the controller 104 may comprise one or more commercially available microprocessors or microcontrollers that facilitate data processing and storage, or may comprise an application specific processing circuit. Various support circuits facilitate operation of the CPU and may include clock circuits, buses, power supplies, input/output circuits and/or the like. The memory includes a Read Only Memory (ROM), Random Access Memory (RAM), disk drive storage, optical storage, removable storage, and the like for storing a control program or for storing data relating to status information. The controller 104 cooperates with the interface computer 106 to generate operational information 130, which may be resident on the interface computer 106, or the farm server 120, or both. In some embodiments, the controller 104 is configured to perform the functions of the interface computer 106.

Further, the interface computer 106 and the farm server 120 are examples of computers that are generally known in the art. As used herein, the term 'computer' will be meant to include a central processing unit (CPU) configured to execute programmable instructions, a memory configured to store data including programmable instructions, support circuits that facilitate the operation of the CPU. The CPU may comprise one or more commercially available microprocessors or microcontrollers that facilitate data processing and storage. The memory includes a Read Only Memory, Random Access Memory, disk drive storage, optical storage, removable storage, and the like. Various support circuits facilitate operation of the CPU and may include clock circuits, buses, power supplies, input/output circuits and/or the like. The memory may further include data and software packages, such as an operating system (not shown), application software packages, and operational information, among others. The computers also include an input and output interface to interact with other computers or electronic devices. Computers may function as servers, clients to a server, interface computers, storage system, and may serve several other functions. In general, various devices may be categorized as computers, and such devices include a laptop computer, a desktop computer, a Personal Digital Assistant (PDA) and the like.

The interface computer 106 stores the operational information 130 associated with the components of the wind turbine module 110, while the farm server 120 is configured to control the entire wind farm 100 comprising the individual wind turbine modules $110_1 \ldots 110_N$. The farm server 120 is further configured to send operational information pertaining to the individual wind turbine modules 110, and receive operating instructions for the individual wind turbine modules 110. For this purpose, the farm server 120 may communicate with other devices, for example, over a communications network (not shown). In certain embodiments, the interface computer 106 aggregates all operational information from controller 104. The operational information comprises the operational information 130, which may be routinely communicated to the farm server 120 by the computer 106.

The operational information 130 includes information of the wind turbine, such as, information on specific values of operational characteristics or parameters such as baseline control parameters, input messages, park or wind farm configuration, error status including error codes from trip time to shutdown time, error history for wind turbine modules or components therein, parametric data pertaining to various operational parameters of the wind turbine modules, wind turbine configuration, wind turbine status, condition/status flags, sensor data among several others. The operational parameters or characteristics may also include environmental configuration, wind turbine configuration among others. Other non limiting examples of operational information include data on parameters such as temperature profile, wind speed, wind speed profile, hardware faults in components such as converters, among others, voltage generated, current generated, accuracy of sensors such as rotor speed sensors, tower vibrations, grid event, among several other parameters associated with one or more components of the wind turbine module 110. Such operational information 130 is advantageously utilized, according to several techniques discussed herein, in automatically resetting the tripped wind turbine 102 and/or the tripped wind turbine module 110. The operational information 130 is routinely monitored for managing the wind turbines. Further, the operational information 130 is a subset of the operational information gathered and/or stored by the controller 104, the interface computer 106 and the farm server 120.

Figure 2:
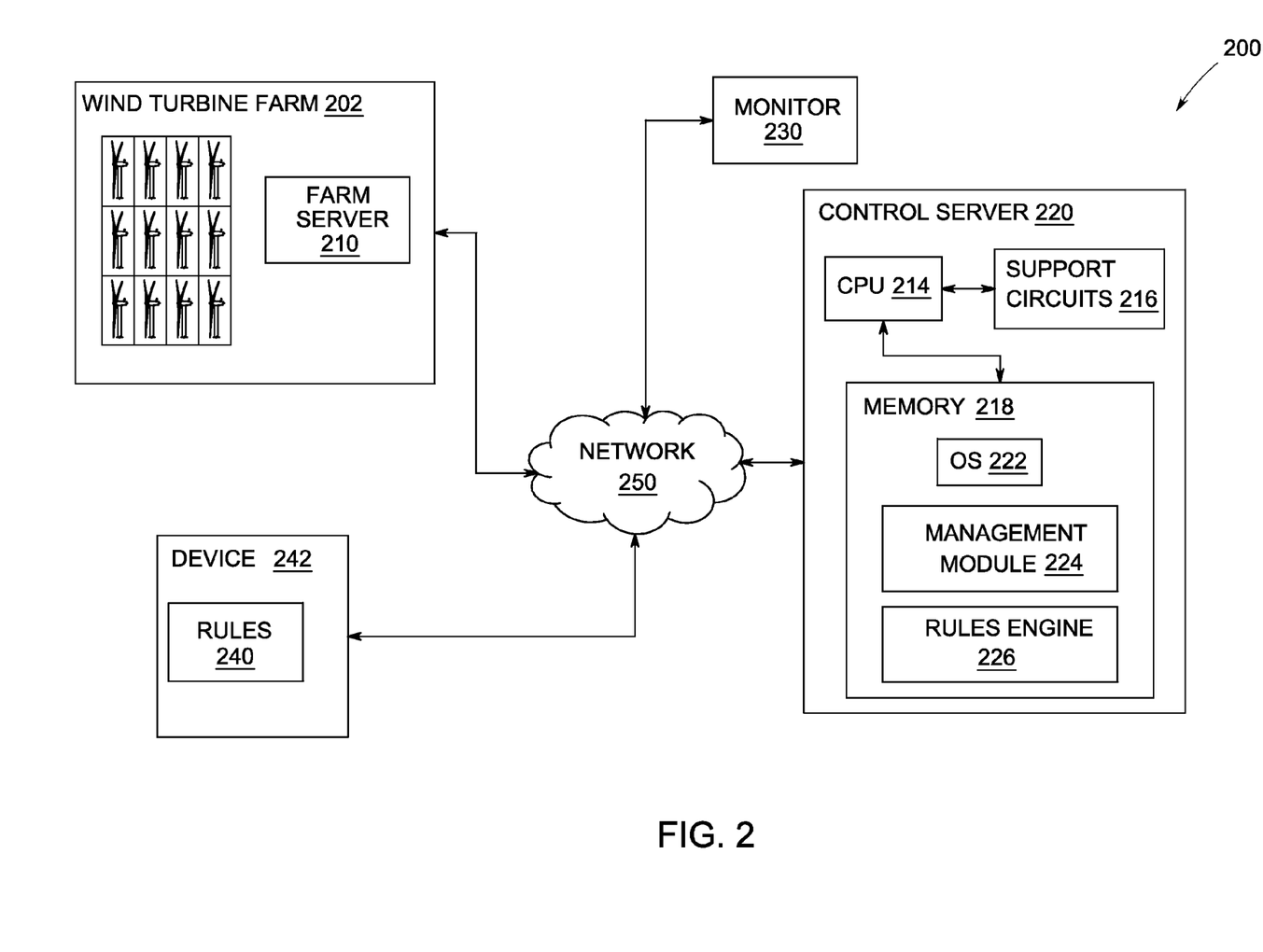
FIG. 2 is a block diagram representation of a system for managing wind turbines according to an embodiment of the invention.

FIG. 2 illustrates a block diagram representation of a system 200 for managing wind turbines according to an embodiment of the present invention. The system 200 includes a wind turbine farm 202, similar to the wind farm 100 as discussed above, the wind farm 202 comprising a farm server 210. The system 200 further comprises a control server 220 for managing the wind turbines, a monitor 230 for accessing the server 220, and rules 240 stored on a device 242. The farm server 210, the server 220, the monitor 230 and the device 242 are communicably coupled to each other through a network 250. In an alternate embodiment, the server 220, the monitor 230 and the device 242 are integrated in the farm server 210. Various components of the system 200 may be arranged and/or integrated in various feasible permutation and/or combination variations. All such variations will occur readily to those skilled in the art, and are included within the scope and spirit of the present invention.

The farm server 210 includes operational information (for example, the operational information 130 of FIG. 1), and as such, the farm server 210 communicates the operational information for each of the wind turbine module on the wind farm 202 to the server 220, over the network 250. The farm server 210 is further configurable to receive and process operating instructions from the server 220, over the network 250, for each of the wind turbine modules $110_1 \ldots 110_N$. For example, the farm server 210 is configured to receive operational information from the interface computers 106, and is further configured to send the operational information to the control server 220. The farm server 210 is also configured to receive operating instructions from the control server 220.

The control server 220 is a computer, such as those generally known in the art. The control server 220 includes a CPU 214, support circuits 216 and a memory 218. The memory 218 includes an operating system 222 and various software packages, such as a management module 224 configured to manage the wind turbines on the wind turbine farm 202, for example, providing monitoring output messages, auto-reset instructions, diagnostic recommendations, among other functions. The memory 218 further includes a rules engine 226 for configuring the rules 240, for example based on operating conditions of the wind turbine and/or analysis of wind turbine faults. In certain embodiments, the farm server 210 is a Supervisory Control And Data Acquisition (SCADA) module, running on, for example, Win NT, VisuPro, or Mark Series platforms, among several others known in the art.

The monitor 230 is a computer, such as those generally known in the art. Generally, the monitor 230 is utilizable to access, monitor or control the server 220, for example, by service personnel for the wind turbines. Service personnel may include site maintenance staff or wind turbine experts for supporting the operations at a wind farm or multiple wind farms.

The service personnel may instruct to reset a particular wind turbine through the server 220 by sending reset instructions over the network 250, to a controller (e.g., the controller 104 of FIG. 1) of that particular wind turbine. In one or more embodiments, the service personnel may advise physical maintenance activities and/or take other corrective actions in case of possible faults in the wind turbines.

The management module 224 includes software code (e.g., processor executable instructions) that when executed, is configured to analyze operational information and determine the fault within the wind turbine. The management module 224 is configured to receive and process operational information, in order to determine if a tripped wind turbine may be automatically reset and further, providing instructions to reset a tripped wind turbine. The management module 224 is also configured to provide enhanced diagnostics on a tripped or a faulty wind turbine to the service personnel.

The management module 224 is further configured to analyze the operational information with respect to the rules relating to the operation of the wind turbines, for example, the rules 240 that are accessible to the management module 224 over the network 250. In the embodiment illustrated by FIG. 2, the rules 240 are comprised in a device 242 communicably coupled to the network 250. However, one of ordinary skill would recognize that other arrangements of the rules 240, such as maintaining the rules 240 on the control server 220, or any other device on the network 250 would result in equally valid embodiments of the present invention.

According to various embodiments, the rules 240 are utilized by the management module 224 to analyze and determine the fault within the wind turbine. For example, the rules 240 may specify a safe range of threshold value of temperatures of various wind turbine components or regions, frequency of occurrence of the errors according to which a tripped wind turbine may be made operational. More specifically, if the temperature of gear box crosses an upper threshold limit, the wind turbine 102 may get damaged or may cease to operate. Accordingly, the controller 104 is configured to trip the wind turbine 102. However, it has been advantageously determined that the wind turbine being tripped due to crossing the temperature thresholds in the gearbox and bearings may be safely reset once the temperature gets below the predetermined safety limit. The rules 240 specify such safety limits or temperature threshold values, and other knowledge on temperature thresholds and several other parameters pertaining to the operation of the wind turbines, the impact of operating conditions, among several other factors. According to an aspect, the set of rules are configurable, and may be configured based on operational information such as historical data, heuristic data, engineering data for the wind turbine, environmental factors, wind turbine configuration, among several others. For example, the rules are configurable to include the knowledge of various conditions to be met for auto-reset of the wind turbine, for generating diagnostic information related to component conditions, baseline parameter mismatching and warning messages (conveyed to service engineer in advance, e.g. days ahead of next maintenance cycle). As another example, the rules 240 may specify the lower and upper limit of electrical parameters such as voltage and current levels that are acceptable. Accordingly, if the wind turbine is tripped due to the voltage and/or the current levels in the wind turbine circuits crossing a particular threshold value, the management module 224 consults the rules 240 and monitors the wind turbine to ascertain if the voltage and/or the current levels have stabilized within the acceptable upper and lower thresholds. It has been advantageously observed that typically, the voltage and/or the current values stabilize within the upper and the lower thresholds within a short duration after a transient behavior.

While only a few examples have been mentioned above, it is appreciated here that the management module 224 is configured to analyze the operational information of the wind turbine in light of the rules 240. The management module 224 is further configured to determine, after a time interval of a wind turbine being tripped, whether the operational parameters of the tripped wind turbine are within permissible ranges of threshold values. In case the operational parameters have stabilized within the corresponding threshold values, the management module 224 is configured to reset the wind turbine (e.g. the wind turbine 102) by instructing the controller 104. The time interval, according to certain embodiments, ranges from about a few seconds to about a few minutes, depending on the nature of the fault.

Occasionally, the operational information may be insufficient to perform analysis. As such, the management module 224 may request for advanced operational information, from the wind turbine module (e.g., the wind turbine module 110 of FIG. 1). The advanced operational information is over and above the operational information routinely received by the management module 224. The farm server 210, in turn, communicates the request to a computer (e.g., the computer 106 of FIG. 1) of the wind turbine module. As discussed, the computer 106 aggregates extensive operational information, from which routine operational information is communicated to the control server 220. Based on request for advanced operational information, the computer 106 is configured to communicate the advanced operational information to the control server 220. In certain embodiments, the computer 106 may, based on request by the management module 224, extract advanced operational information of the wind turbine module, such as current operating or environmental conditions, for example, current wind speed, wind gust data, and the like. The additional or advanced operational information provides the management module 224 to make an enhanced assessment of the conditions prevalent at the wind turbine module 110.

For example, the management module 224 may determine that a wind turbine was tripped because wind speed profile crossed a pre-defined threshold due to a gust of wind. The management module 224, in such conditions, may continue to monitor the current wind speed profile to ascertain the time at which the wind speed profile is within the acceptable thresholds. Additionally, the management module 224 may request for data that indicates if any damage was done to the wind turbine or other associated components by the wind gust that caused the trip of the wind turbine. Another example related to asymmetric generator current, in which the turbine is tripped if asymmetric current is found in any of the generator phases. In such cases, the management module 224 checks whether the threshold parameter that indicates the limit for asymmetric generator current, is set correctly in the turbine. If the parameter is set to an incorrect value, the management module 224 gives a diagnostic message indicating that the asymmetric generator current threshold is set to an incorrect value, and instructs that the threshold be changed to the correct value. In a next step, using snapshot current measurements in the generator phases, the management module 224 determines which phase is defective. Further, the management module 224 checks whether the fault occurred within a permissible number of times, limited by a pre-defined frequency limit. If the fault has occurred permissible number of times, the management module 224 sends an auto-reset command for the turbine to reset. If the fault occurred more than the permissible number, the management module 224 generates a service request for a service engineer.

As another example, the management module 224 may determine that an electrical system tripped due to a surge in the voltage and/or the current in the circuits. The management module 224 may continue monitoring the operational information to identify when the voltage and/or current values have stabilized within the corresponding threshold limits. In case, it is identified that the voltage and/or the current values have not stabilized at expected ranges, or, in any case, are abnormal, the management module 224 may request advanced operational information to ascertain causes for the abnormality. For example, using additional information, the management module 224 ascertains, in conjunction with the rules 240 that certain circuit components may be malfunctioning, causing the abnormality. In such cases, the management module 224 communicates a warning and/or a detailed diagnostic log for the expert to perform corrective actions.

In several cases, an enhanced diagnosis of the wind turbine operational conditions, as described above, allow for an automatic reset of the wind turbine 102 in cases for which an automatic reset that has not been feasible earlier. In other cases, a detailed fault log is generated for the trained personnel, thereby considerably reducing the analysis time burden on the personnel, and consequently reducing the mean time to return to service for the wind turbines.

According to an embodiment of the present invention, a method for managing a wind turbine comprises receiving operational information of a wind turbine. The operational information is analyzed based on a set of rules. In case of a wind turbine being tripped, the analysis determines whether the trip of the wind turbine is resettable, that is, if the fault causing the trip is a soft fault or a hard fault.

According to another embodiment of the invention, a method for managing a wind turbine comprises receiving operational information of a wind turbine. The operational information is analyzed based on a set of rules. In certain embodiments, it may be determined by analyzing the operational information received routinely that advanced operational information is required to analyze the wind turbine performance and/or faults therein. In such cases, advanced operational information is retrieved from the wind turbine, based on the initial analysis of operational information received routinely. The advanced operational information is then received and used for conducting an enhanced diagnostic analysis of the wind turbine. This process of receiving advanced operational information may be iterated as required. According to various embodiments, the advanced operational information includes sensor data of the wind turbine up to the trip. In certain other embodiments, the advanced operational information further includes sensor data after the wind turbine has tripped. The enhanced diagnostic analysis is helpful in determining whether the trip of the wind turbine is resettable.

If a resettable fault is determined, the wind turbine is reset. If, however, the fault is not resettable, a detailed diagnostic report is generated for further manual analysis, for example, by service personnel.

Figure 3:
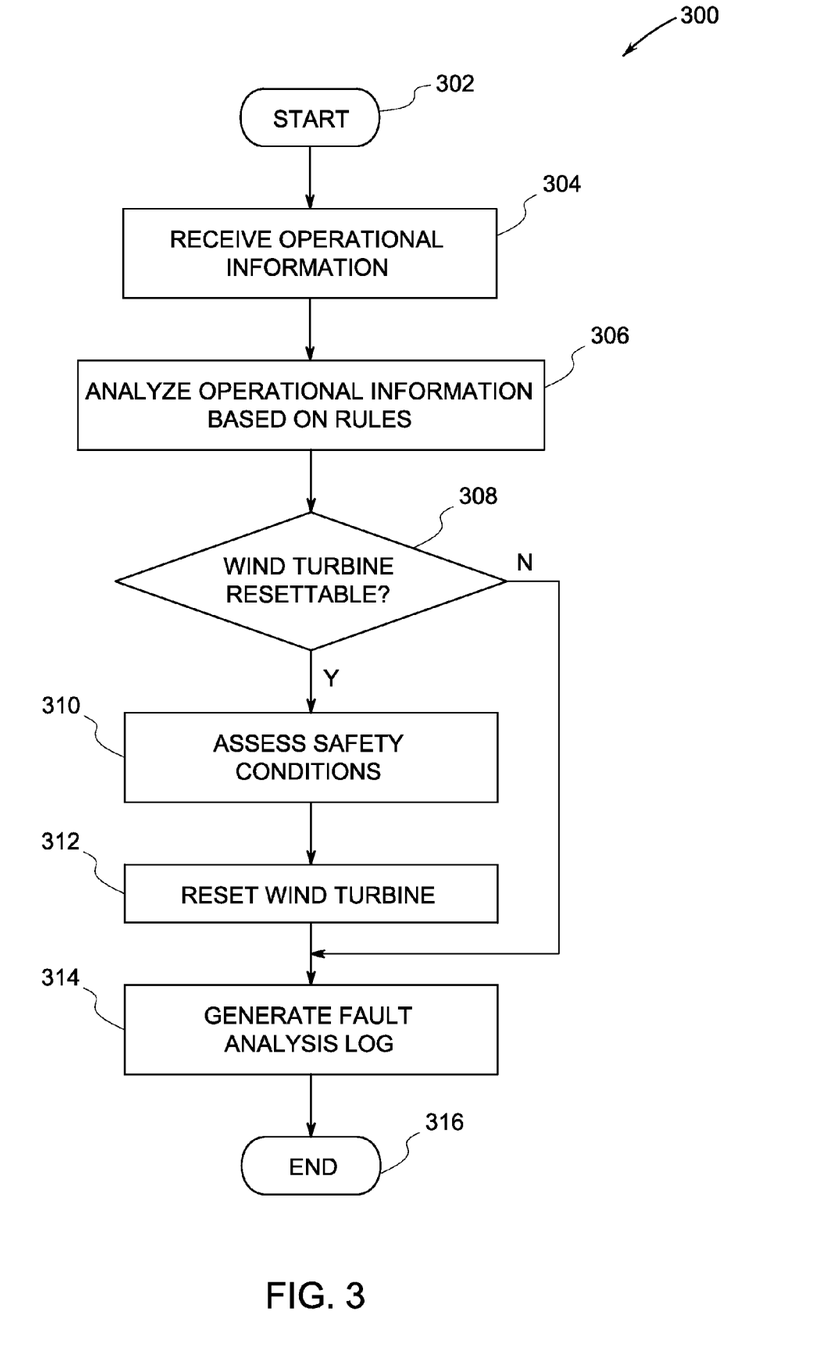
FIG. 3 is a flow chart representing steps involved in a method for managing wind turbines in accordance with an embodiment of the invention.

Referring now to FIG. 3, a flow chart representing steps involved in a method 300 for automatically resetting a wind turbine, for example, the wind turbine 102 is illustrated. The method 300 may be implemented by a management module (e.g., the management module 224 of FIG. 2) resident on the server 220. The management module 224 processes operational information (e.g., the operational information 130 of FIG. 1) of the wind turbine 102 to provide an automatic reset to the tripped wind turbine. It is appreciated here that while the method embodiments discussed herein may refer to elements from FIG. 1 and FIG. 2, such embodiments are not limited to the system elements of FIG. 1 and FIG. 2.

The method 300 starts at step 302 and proceeds to step 304 at which the operational information of the wind turbine is received. In one embodiment, a control server (e.g., the control server 220 of FIG. 2) receives the operational information of the wind turbine from a farm server (e.g., the farm server 120 of FIG. 1 and the farm server 210 of FIG. 2).

For example, a line voltage fault may occur within the wind turbine due to which the wind turbine is tripped. In general, the line voltage fault may occur due to a defective relay output, grid voltage error and/or the like. Accordingly, the management module 224 receives the operational information such as, frequency of the occurrence of the fault, one or more consecutive voltages after the trip time of the wind turbine, among other operational information.

At step 306, the operational information is analyzed with respect to rules, for example, the rules 240 of FIG. 2. In one embodiment, the management module 224 analyzes the operational information 130 of the wind turbine modules 110 to determine if the fault that caused the wind turbine to be tripped is resettable. To accomplish whether the fault is resettable, the operational information is compared with respect to the rules.

According to an embodiment, in the line voltage fault example, the rules are configured to define that for the wind turbine to be reset automatically after the trip, the frequency of occurrence of the line voltage fault should be less than ten instances over the last twenty-four hours and/or less than twenty instances over the last seven days. In another embodiment, the configured rules define that the three consecutive voltages from the time since the wind turbine tripped should be in range of 200 Volts and 400 Volts.

According to certain embodiments, the management module 224 analyzes the received operational information with the rules defined for a corresponding fault that caused the wind turbine to be tripped. In other words, the management module 224 analyzes whether the operational information of the tripped wind turbine lies within the threshold limits as defined in the rules corresponding to the fault that caused the wind turbine to be tripped. If the operational information indicates that the operational parameters lie within the threshold limits, the fault is identified as resettable. According to one embodiment, faults that have not occurred frequently, and the magnitude of such faults is within a predetermined tolerance limit are typically resettable. If, however, the operational information indicates that the operational parameters of the wind turbine breach the threshold limits corresponding to a particular fault or the frequency with which such faults have occurred, the wind turbine is not reset. According to certain embodiments, a request for changing the operational parameter to a correct value is sent to service team.

Specifically, at step 308, a determination is made as to whether the fault is resettable. If, at the step 308, it is determined that the fault is not resettable (option "NO"), the method 300 proceeds to step 314. If at the step 308, it is determined that the fault is resettable (option "YES"), then the method 300 proceeds to step 310. At the step 310, safety conditions for the wind turbine to be operational are assessed. If the safety conditions are satisfied, the wind turbine is reset at step 312, such that the wind turbine becomes operational. In one embodiment, the management module may provide an instruction to a controller (e.g., the microcontroller 106 of FIG. 1) of the wind turbine, to reset the wind turbine. The method 300 proceeds to step 314.

At the step 314, a diagnostic fault analysis log is generated. The log is utilizable by an expert, or service personnel. According to one embodiment, a detailed diagnostic report on the wind turbine is generated, and the service personnel are alerted.

In one embodiment, the management module alerts the expert regarding the fault of the wind turbine. For example, if the frequency of the occurrence of the above mentioned line fault voltage is more than the limits defined within the rules (frequency>=six for last seven days), it is determined that the fault causing the wind turbine to trip is not resettable. Accordingly, the management module alerts the expert regarding the fault of the wind turbine, additionally providing the expert with a diagnostic log of the operational parameters pertaining to the fault. In another embodiment, the expert analyzes the fault of the wind turbine. The method 300 ends at step 316.

According to various embodiments of the method 300, the operational information is received for monitoring various faults due to which a wind turbine may be tripped. For example, for trips due to storm/gust of wind are generated once the slope of wind speed profile crosses a pre-defined threshold. The trips due to such can be reset once wind becomes steady and the average wind speed is below a predetermined safety threshold. According to an embodiment, the rules are configured to define the average wind speed threshold at 5 m/s. In other embodiments, the rules are configured to define the average wind speed threshold at 8 m/s. As discussed below, the rules are configurable based upon various operating configuration factors including the operational information, environmental conditions, wind farm configuration, turbine configuration, among others, the rules provide different threshold values for different operating configurations.

As discussed, wind turbine may be tripped due to temperature in the gearbox and bearings crossing the temperature thresholds and the turbine can be safely reset once the temperature is below the predetermined safety limit. Another instance of faults causing the wind turbine to be reset relate to converter and other similar hardware units of the wind turbine module. According to an embodiment, the wind turbine may be reset, for example, if the frequency of occurrence of such fault in given period (1 hour/1 day/1 week/1 month) does not exceed more than the pre-decided threshold value for that period. Faults in generator and rotor speed sensors may also cause the wind turbine to be tripped. For trips due to such faults, according to an embodiment, the speed sensors are checked for allowable percentage error, and if the difference among the speed sensors falls below a pre-determined threshold value, the turbine may be reset. Further, the wind turbine may be tripped due to wind turbine tower vibrations. The wind turbine may also be tripped in case of a grid event, such as a fault in the grid, or the grid being tripped, among others. According to an embodiment, the wind turbine may be reset after the grid is restored, and sufficient time has elapsed.

Faults as discussed above, and several other faults of the wind turbine module and corresponding threshold values will occur readily to those skilled in the art. The various techniques disclosed herein are configured to provide operational information relating to such faults and provide an automatic reset of the wind turbine, and all such variations lie within the scope and spirit of the present invention.

Figure 4:
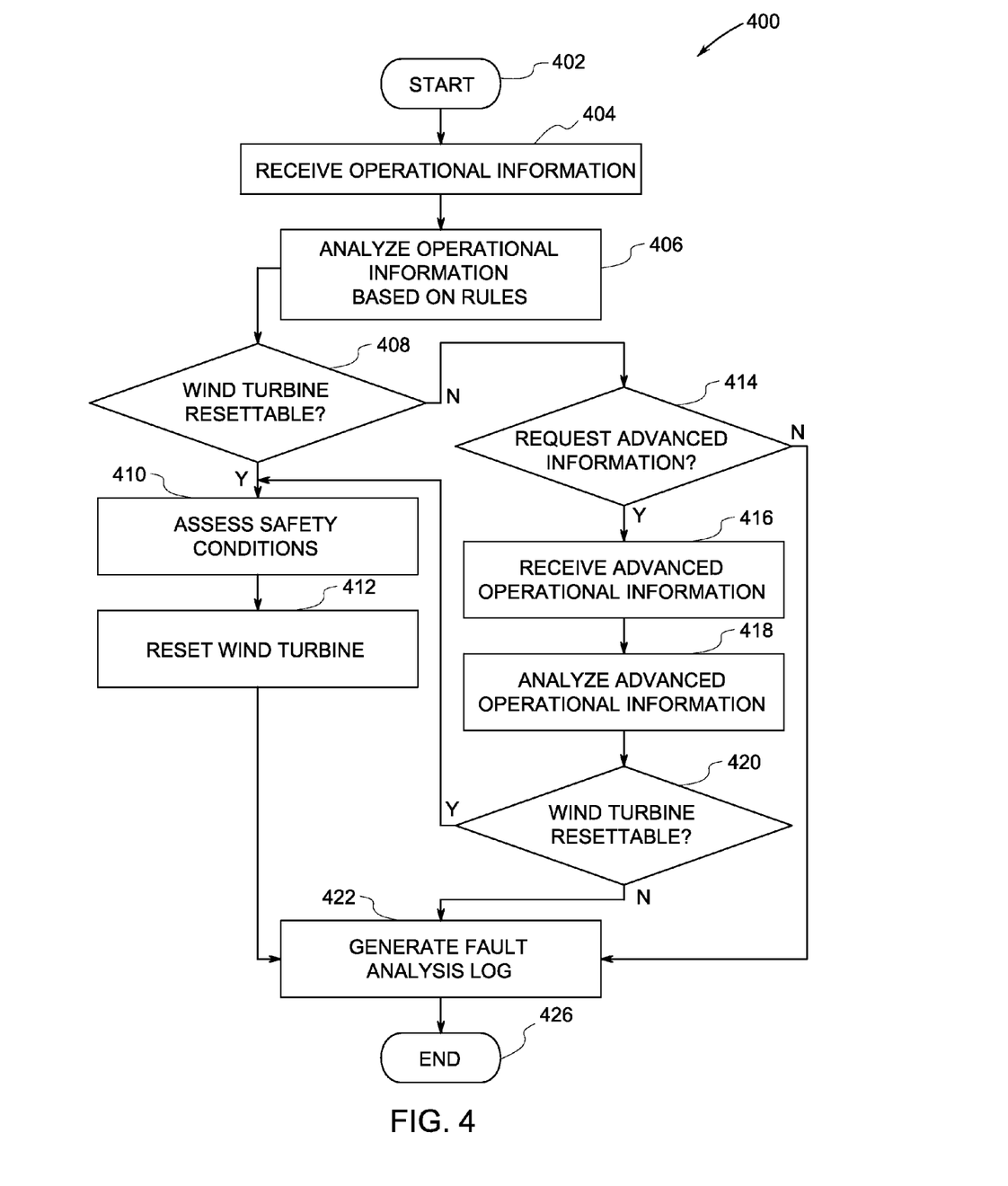
FIG. 4 is a flow chart representing steps involved in a method for managing wind turbines in accordance with another embodiment of the invention.

FIG. 4 is a flow chart representing steps involved in a method for automatically resetting a wind turbine according to another embodiment of the present invention. The method 400 starts at step 402 and proceeds to step 404 at which operational information of the wind turbine is received. In one embodiment, a control server (e.g., the control server 220 of FIG. 2) receives the operational information of the wind turbine from a farm server (e.g., the farm server 104 of FIG. 1 or the farm server 210 of FIG. 2).

At step 406, the operational information is analyzed with respect to rules (e.g., the rules 240 of FIG. 2). The analysis of operational information may reveal whether the fault that caused the wind turbine to be tripped is a resettable fault. The analysis of operational information with respect to the rules may further determine whether advanced operational information of the wind turbine needs to be requested, for further analysis of the fault that caused the wind turbine to be tripped, and/or resetting the tripped wind turbine.

At step 408, a determination is made as to whether the fault is resettable. If it is determined that the fault is resettable (option "YES"), the method 400 proceeds to step 410. At the step 410, the safety conditions for making the wind turbine operational are assessed. If the safety conditions are satisfied, the wind turbine is reset to start operating at step 412. If, however, at the step 408, it is determined that the fault is not resettable (option "NO"), the method 400 proceeds to step 414.

At the step 414, a determination is made as to whether advanced operational information needs to be requested in order to analyze further, the fault that caused the wind turbine to be tripped. It may be determined that advanced operational information may also be required to reset the tripped wind turbine.

If at the step 414, it is determined that advanced operational information does not need to be requested (option "NO"), the method 400 proceeds to step 422. In certain cases, for example, it may be determined that the fault that caused the wind turbine to be tripped is a fault that may not be reset without appropriate intervention by the service personnel. In such cases, the method 400 generates an enhanced diagnostic fault analysis log at the step 422. The enhanced diagnostic fault analysis log is utilizable by the service personnel to identify the nature of the fault and plan an appropriate remedial action, advantageously, in a shorter response time.

If, however, at the step 414, it is determined that advanced operational information needs to be requested (option "YES"), the method 400 proceeds to step 416, at which advanced operational information is received. At step 418, the advanced operational information is analyzed based on the rules. The analysis at the step 418 determines whether the fault that caused the wind turbine to be tripped may be reset.

Accordingly, a determination is made at step 420, as to whether the wind turbine is resettable. If it is determined that the wind turbine is not resettable (option "NO"), then the method 400 proceeds to step 422, at which an enhanced diagnostic fault log is generated. If at step 420, however, it is determined that the wind turbine is resettable (option "YES"), the method 400 proceeds to step 410, at which safety conditions for operating the wind turbine are assessed. If the safety conditions for operating the wind turbine are met at the step 410, the method proceeds to step 412, at which the wind turbine is reset to resume operation. The method 400 then proceeds to step 422 at which an enhanced diagnostic fault log is generated. In one embodiment, the management module alerts the expert regarding the fault of the wind turbine. The method 400 ends at step 426.

With respect to the method 400, according to one embodiment, the management module 224 analyzes the operational information of the wind turbine. For example, a wind turbine, the wind turbine 102, may be tripped due to a temperature fault in gearbox and/or bearings of the wind turbine. In general, the temperature fault may occur if the temperature of the wind turbine 102 crosses a particular temperature threshold value. In such a condition, the management module analyzes the operational information 130 relating to the temperature of the gearbox and/or the bearings of the wind turbine 130 with respect to the rules. In this embodiment, the operational information 130 may not be sufficient to determine as to whether the wind turbine can be reset. Accordingly, the management module 224 determines whether the operational information 130 received is sufficient to reset the tripped wind turbine 102. The determination whether the operational information is sufficient or advanced operational information is required is based on analysis of the fault that caused the wind turbine to be tripped, the operational information 130 received and the rules 240.

According to an embodiment of the invention, the rules are configurable. As discussed, the rules are configured based various operating configuration factors, including, but not limited to operational information of the wind turbine, environmental conditions, farm configuration, wind turbine configuration, among others. The rules are configured to determine threshold values according to various operating configuration factors.

Figure 5:
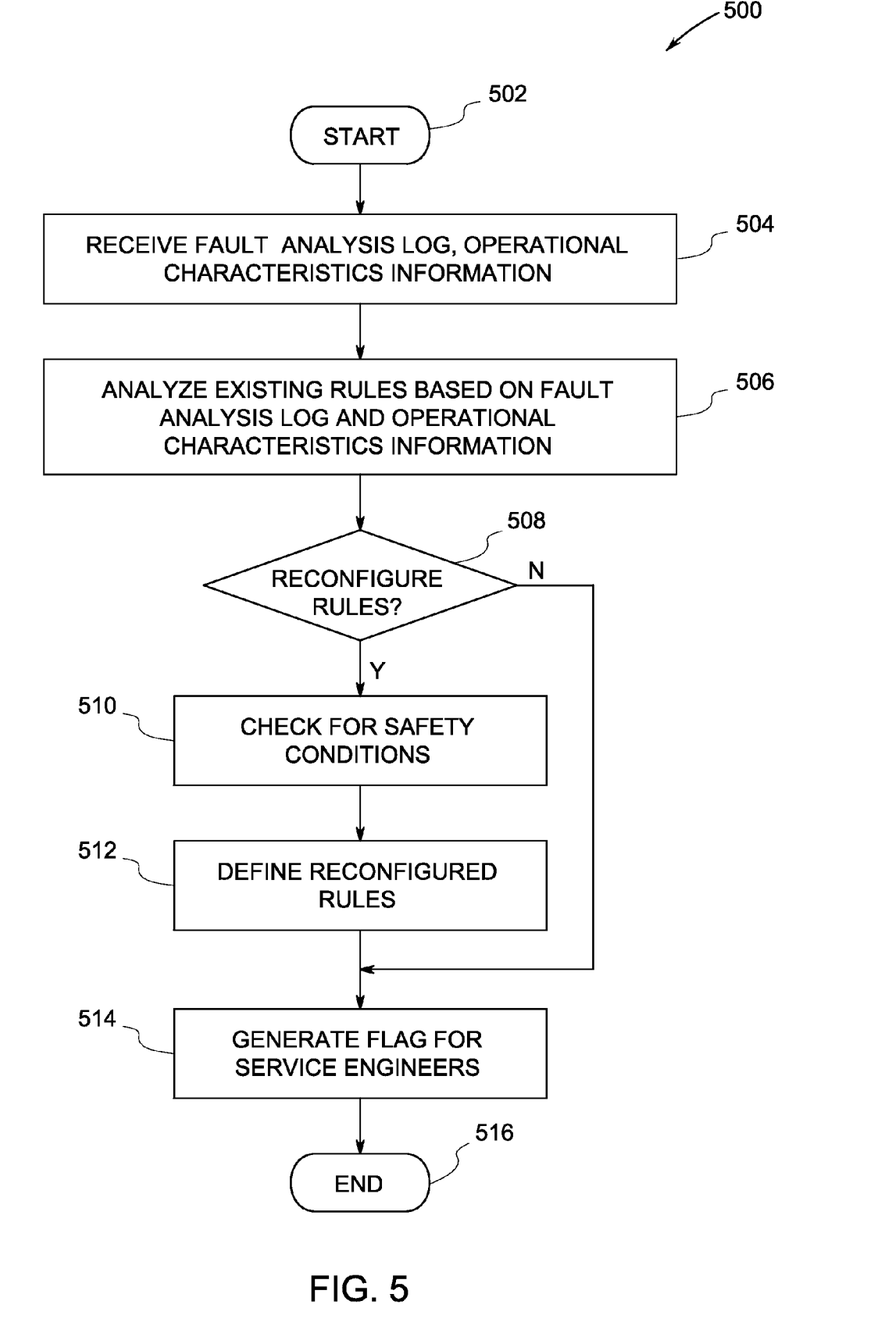
FIG. 5 is a flow chart representing steps involved in a method for configuration of the rules, in accordance with another embodiment of the invention.

FIG. 5 illustrates a method 500 for configuring rules based on operating configuration of the wind turbine. As discussed, operating configuration of the wind turbine comprises several factors, including but not limited to, operational information of the wind turbine, trip and reset history of the wind turbine, engineering information of the wind turbine, farm configuration, wind turbine configuration, environmental conditions, and conditions or factors that affect the operational health of the wind turbine and/or the wind-farm. The method 500 starts at step 502, and proceeds to step 504 at which operating configuration information and/or fault analysis logs for a wind turbine are obtained. At step 506, the rules are analyzed based on the fault analysis logs and the operating configuration information.

According to an embodiment, at the step 506 the fault analysis logs and the operating configuration are compared to assess whether the rules (including threshold parameters) need to be reconfigured for the existing operating configuration of the wind turbine. According to an embodiment, the analysis may indicate that a particular error that causes the wind turbine to trip is occurring due to a threshold value that is low for the operating configuration of the wind turbine. For example, it may be determined that in some geographic regions the environment is particularly windy, and the frequency of a wind turbine tripping due to wind gusts is higher than in other geographical regions. In other cases, it may be determined that particular seasons are windier than other seasons for the same geographical region. In such cases, if the threshold for frequency of wind turbine trip within a particular time interval is configured according to comparatively less windy geographical region (less windy season), the wind turbine will trip more than the threshold frequency in case of windy geographic regions (or windy seasons). In such cases, therefore, the wind turbine will not be automatically reset, even though the conditions are favorable for reset and/or the fault may be resettable. Based on such analysis, it may be determined that the threshold frequency and other rules needs to be reconfigured according to the analysis of the fault analysis log and the operating configuration information for the wind turbine. At this stage, a set of potential reconfigured rules may be defined in accordance with the analysis.

Accordingly, at step 508, a determination is made at step as to whether the rules need to be reconfigured. If it is determined that the rules do not need to be reconfigured, (option "NO"), then the method 500 proceeds to step 514. If at step 508, however, it is determined that the rules need to be reconfigured (option "YES"), the method 500 proceeds to step 510, at which safety conditions for operating the wind turbine are assessed. If the safety conditions are satisfied according to potential reconfigured rules, at step 512 the potential reconfigured rules are defined as the new existing rules. In one embodiment, the management module 224 may update the rules (e.g., the rules 240 of FIG. 2) of the wind turbine. The method 500 proceeds to step 514. At the step 514, a flag for service engineers is generated, and the flag may include an enhanced diagnostic fault log comprising details of the analysis at the step 506, and/or defining the rules according to the step 512.

Advantageously, the rules are easily configurable to accommodate additional learning from the field, i.e. learning about operational information, environmental conditions, farm and turbine configurations, and the like. Accordingly, while some specific threshold values have been discussed as examples, those skilled in the art will readily appreciate that various embodiments as discussed, provide for application of rules that are configurable according to operating configuration, in order to determine if a turbine can be reset. Further, according to some embodiments, the service engineer/team configures (or reconfigures) rules based on operational information for the wind turbine. The reconfigured rules may be deployed for a test period, updated, reconfigured, and then incorporated as defined existing rules in the wind turbine management system 200.

Operating/operational characteristics or operating/operational parameters generally refer to characteristics/parameters of the wind turbine, wind turbine configuration, farm configuration, environmental conditions, among information on several other parameters pertinent to the operation of a wind farm. The terms "operational information" and "advanced (or additional) operational information" includes operational information of the various operating parameters/operating characteristics of the wind turbine, and data on any other operational configuration pertinent to the operation of the wind turbine.

Those skilled in the art will appreciate that although various embodiments disclosed herein have been discussed with respect to the environment illustrated by FIG. 1 and FIG. 2, such embodiments are not limited to the arrangements illustrated by FIG. 1 and FIG. 2. For example, in one embodiment, the farm server 210 and the control server 220 may be a single computer. In other embodiments, the rules 240 may reside on the control server 220. In yet other embodiments, the monitor 230 may not be included, and service personnel may access the control server 220 directly. In other embodiments, the management module 224 comprises the functionality of the rules engine 226. In other contemplated embodiments, the rules engine 226 may reside on the device 242. It is further contemplated in certain embodiments that the interface computer 106 may also provide the functionality of the monitor 230, and vice versa. These and other obvious variations of the various computer components and/or functions as disclosed herein will appear readily to those skilled in the art, and all such variations are included within the scope and spirit of the present invention.

Further, it is appreciated here that the term "network" as discussed herein includes all communications network capable of communicating data to devices communicably coupled to the network. Non limiting examples of such communications network include Local Area Networks, application specific networks, storage networks, the Internet, networks on the communication channels including the PSTN, CDM, GSM networks, among others.

The various embodiments disclosed herein offer several advantages in managing the wind turbine systems. According to an advantage, providing an automatic reset reduces the mean return time to service (MRTS) for the wind turbines, considerably improving the performance of a wind turbine farm. Further, creating detailed and enhanced (based on the nature of the fault) diagnostic logs may help service personnel identify and remedy the wind turbine faults in considerably less time. Further, generation of enhanced diagnostic logs reduces the number of personnel required for managing wind turbines.

While only certain features of the invention have been illustrated and described herein, modifications and changes will occur to those skilled in the art. It is, therefore, to be understood that the appended claims are intended to cover all such modifications and changes as fall within the true spirit of the invention.

The invention claimed is:
1. A method for managing a wind turbine, the method comprising:
receiving operational information (130) on operational characteristics of a wind turbine (102);
analyzing the operational information (130) based on a set of rules (240), the set of rules being configurable;
determining that advanced operational information (130) of the wind turbine (102) is required based upon analyzing the operational information (130), wherein the advanced operational information (130) comprises a history of the operational information (130) in the recent past, the advanced operational information (130) comprising sensor data of the wind turbine (102) up to, and after a trip caused by a fault of the wind turbine;
receiving the advanced operational information (130) of the wind turbine when the advanced operational information (130) of the wind turbine (102) is required;
analyzing the advanced operational information (130) based on the set of rules;
determining whether the fault of the wind turbine (102) is resettable based on at least one of the operational information (130) and the advanced operational information (130); and
resetting the wind turbine (102) when the fault of the wind turbine is resettable.

2. The method of claim 1, wherein the operational information (130) comprises information on at least one of wind speed, wind speed profile, temperature of wind turbine (102) components, voltage, current, converter, generator, rotor speed sensors, tower vibrations, hardware units of the wind turbine (102), and/or a grid event, and wherein the analyzing comprises further processing the operational information (130).

3. The method of claim 1, wherein the analyzing comprises referring to the set of rules (240) with respect to the operational information (130) of the wind turbine (102), the set of rules (240) comprising threshold values for the operational characteristics of the wind turbine (102) and derivatives of the operational characteristics of the wind turbine (102), and wherein the set of rules (240) comprises threshold values for at least one of wind speed, wind speed profile, temperature of the wind turbine (102) components, voltage levels, current levels, converter faults, generator faults, rotor speed sensors faults, tower vibrations, faults in the hardware units of the wind turbine (102), and a grid event.

4. The method of claim 1, wherein the set of rules (240) are further configured based on the operational characteristics (130) of the wind turbine (102) and fault analysis of the wind turbine (102).

5. A wind turbine management system, comprising:
a wind turbine (102) operable to generate electricity using wind energy, the wind turbine (102) comprising operational characteristics related to the operation of the wind turbine (102);
a control server (220) comprising a wind turbine management module (224) configured to implement the steps of:
receiving operational information (130) on operational characteristics of a wind turbine (102);
analyzing the operational information (130) based on a set of rules (240), the set of rules being configurable;
determining that advanced operational information (130) of the wind turbine (102) is required based upon analyzing the operational information (130), wherein the advanced operational information (130) comprises a history of the operational information (130) in the recent past, the advanced operational information (130) comprising sensor data of the wind turbine (102) up to, and after a trip caused by a fault of the wind turbine (102);
receiving the advanced operational information (130) of the wind turbine (102) when the advanced operational information (130) of the wind turbine (102) is required;
analyzing the advanced operational information (130) based on the set of rules;
determining whether the fault of the wind turbine (102) is resettable based on at least one of the operational information (130) and the advanced operational information (130); and
a network (250),
wherein the wind turbine (102) is communicably coupled to the management module (224) via the network (250), and wherein a rule configuration module is accessible via the network (250).

6. The system of claim 5, wherein the operational information (130) comprises information on at least one of wind speed, wind speed profile, temperature of wind turbine (102) components, voltage, current, converter, generator, rotor speed sensors, tower vibrations, hardware units of the wind turbine (102), a grid event, or combinations thereof.

7. The system of claim 5, wherein the control server (220) further comprises a rules engine (226) for configuring the rules (240) based on the operational characteristics of the wind turbine (102) and based on a fault analysis of the wind turbine (102).

8. The system of claim 5, wherein the management module (224) is configured to reset the wind turbine (102) if the fault of the wind turbine (102) is resettable.

9. The system of claim 5, wherein the wind turbine (102) further comprises:
a controller (104) configured to receive and process the operational information (130) of the wind turbine (102), the controller (104) further configured to control the operation of the wind turbine (102);
an interface computer (106) configured to receive the operational information (130) of the wind turbine (102) from the controller (104), and send the operational information (130) of the wind turbine (102) to be communicated over the network (250), the interface computer (106) configured to receive instructions for operating the wind turbine (102), and send the instructions for operating the wind turbine (102) to the controller (104); and
a farm server (120) operably coupled to the interface computer (106) and to the network (250), the farm server (120) configured to receive operational information (130), and/or store operational information (130), of the wind turbine (102), the farm server (120) configured to receive the operating instructions (130) for the wind turbine (102) from the control server (220) over the network (250), and further communicate the operating instructions to the interface computer (106).

* * * * *